INVENTOR.
George B. Scheer
BY
Attorney

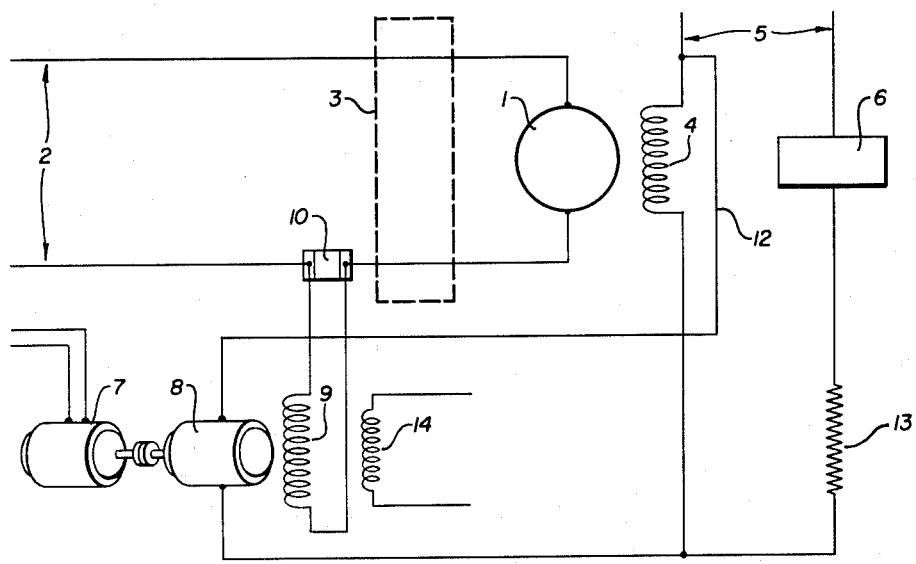
_Fig. 3_
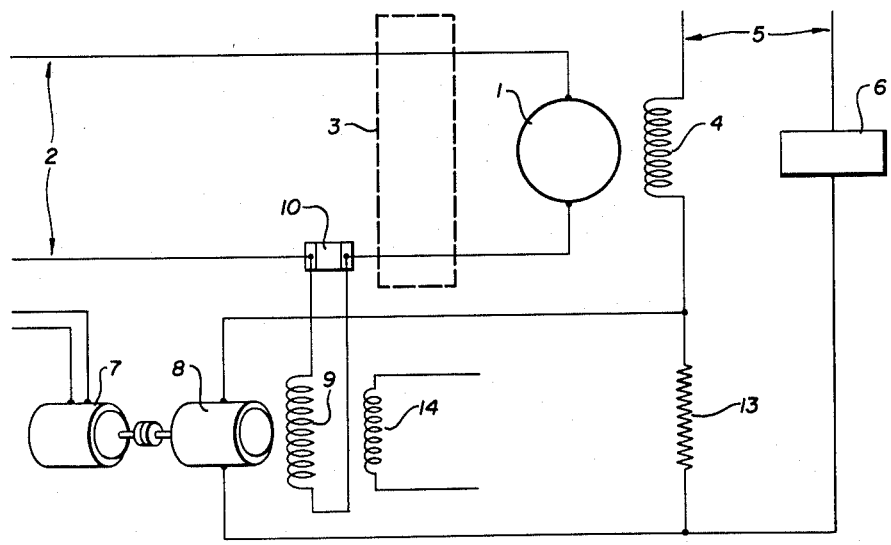
_Fig. 4_
INVENTOR.
George B. Scheer
BY James E. Toomey
Attorney Oct. 17, 1961 G. B. SCHEER 3,005,138
STABILIZATION OF D.C. SHUNT MOTORS
Filed Dec. 29, 1958 4 Sheets-Sheet 4

INVENTOR.
George B. Scheer
BY James E. Toomey
Attorney

United States Patent Office 3,005,138
Patented Oct. 17, 1961

3,005,138
STABILIZATION OF D.C. SHUNT MOTORS
George B. Scheer, Berkeley, Calif., assignor to Henry J. Kaiser Company, Oakland, Calif., a corporation of Nevada
Filed Dec. 29, 1958, Ser. No. 783,306
1 Claim. (Cl. 318—332)

This invention relates generally to an improvement for direct current motors. More particularly, it relates to a method and apparatus for maintaining the stable characteristic of a shunt motor.

Where direct current motors are used to drive machinery, particularly metal rolling mill equipment, it is usually necessary to use what are known as compound wound motors. A D.C. (direct current) compound motor is one which has both a shunt field and a series field. This type of motor is necessary particularly in the case of rolling mill motors because it has a stable operating characteristic.

The D.C. shunt motor which would have significant advantages over the D.C. compound motor in powering rolling mills has a serious disadvantage, namely, an unstable characteristic. When mechanical load is applied to the motor, the speed should decrease for the motor to be stable. However, in the case of a D.C. shunt mill motor, as the armature reaction is of such great magnitude, the effect of armature reaction will reduce the resultant field to the extent that the motor will actually increase in speed as load is applied. As the load will normally increase as the speed is increased, an unstable condition is produced.

Where the motor is required to operate in a single direction only, the use of compound motors is not particularly objectionable as the only additional cost involved is the slightly additional price of a compound motor as compared with a shunt motor. However, most motors in rolling mills, e.g. steel mills, as well as in other industries, are required to be reversed. If a shunt motor were used requiring a current of such value that a single cable is sufficient, it is only necessary to install two such cables to operate the motor for reversal. This is in addition to the small size cables required for the shunt field and miscellaneous items such as overspeed devices, brakes, switches, etc.

For a compound motor it is necessary to install four such cables if reversal is required. This is because the series field of the compound motor must be reversed with respect to the armature circuit when the direction of the motor is reversed.

Compound motors as referred to above include not only what are commonly known as compound motors, but also include what are known as shunt stabilized motors, as well as any other form of motor that includes both a series and a shunt winding.

Accordingly, it is an object of this invention to provide a method of operating a shunt motor and novel arrangements of electrical components for use therein which will eliminate the unstable characteristic of a shunt motor.

It is also an object of this invention to provide a method of operating a shunt motor and novel arrangements of electrical components for use therein for maintaining the stable characteristic of a shunt mill motor, thereby substantially reducing the motor installation cost heretofore experienced in the use of compound mill motors.

It is a further object of this invention to provide a novel arrangement of electrical components, in combination with a shunt mill motor which can be reversed, for maintaining the stable characteristic of the shunt motor, thereby giving a savings in wiring costs and a savings in energy over heretofore used mill motor installations.

It is an additional object of this invention to provide novel arrangements of electrical components, in combination with a shunt motor, such that the motor may be used for reversible purposes and the field applied to the shunt motor combines the characteristics of the series field and a shunt field that make up a compound motor.

These and other objects and advantages will be more apparent from a consideration of the following detailed description, when taken in conjunction with the drawings.

It has been found that the current in the armature of a shunt motor can be used to give a control of the shunt field so that, as the armature current increases, the shunt field of the motor also increases. This thereby eliminates the need for any other field on the motor, for example a series field, and thus simplifies the motor itself but, in particular, saves on the wiring cost. For the basis of discussion, a 100 H.P. 230 volt mill type motor will draw a current of 355 amperes under full load conditions in the armature and 4.58 amperes in the shunt field. The size of cable as used in some steel mills will require three 250,000 circular mil size in each line or a total of six cables for the armature circuit only. If a series field is used, whether for what is known as a compound motor or a shunt stabilized motor, six additional cables of 250,000 circular mil size are required, and it is this item that the instant invention will eliminate. The lengths of these cables may be substantial, for example, on the order of 50 to 200 feet. The shunt field will normally only require No. 10 wire.

According to this invention, a direct current shunt motor is operated by a method comprising the steps of obtaining an indication of current in the armature of said motor and increasing the magnetic flux of the shunt field upon increase of current in the armature, thereby eliminating the unstable characteristic. The characteristic of a compound or stabilized shunt motor is obtained without the necessity for a series field. This is done while using either a variable potential source or a constant potential source of power and without the aid of special rotating equipment for operation of the armature voltage. One or more low current fields may be employed in the motor.

The apparatus of this invention, which may be utilized in practice of the disclosed method, broadly comprises in combination with a direct current shunt motor a group of components comprising means for obtaining an indication of current in the armature of said motor and means for increasing the magnetic flux of the shunt field upon increase of current in the armature, thereby eliminating the unstable characteristic of the motor.

In the accompanying drawings, forming a part of this specification, and in which like numerals are employed to designate like parts throughout the same:

FIGURES 2, 3 and 4 are diagrammatic sketches showing modifications of FIGURE 1;

Figure 1:
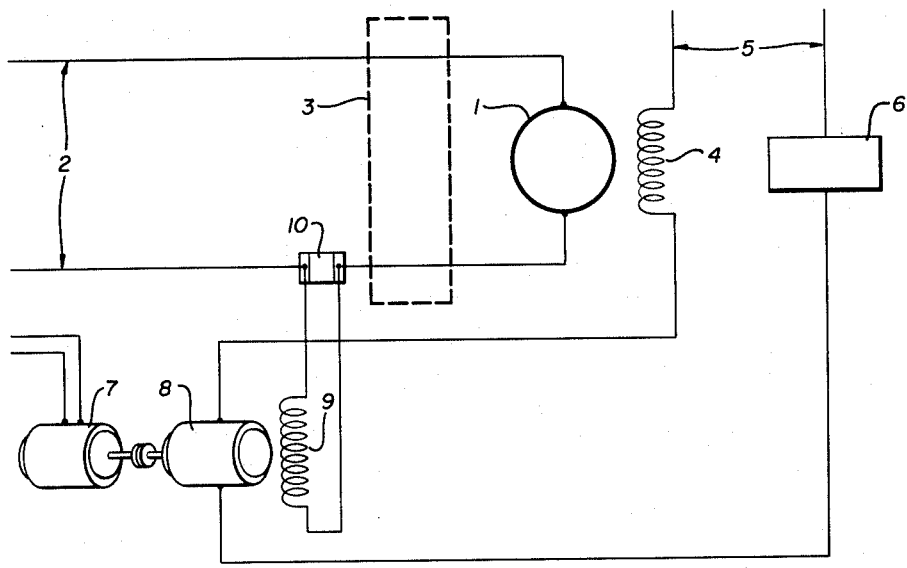
FIGURE 1 is a diagrammatic sketch showing one embodiment of an arrangement of a group of electrical components for carrying out the invention wherein a motor generator is connected to the shunt field of a mill motor.

In FIGURE 1, which discloses diagrammatically an embodiment for carrying out the invention, 1 indicates the armature of the motor while 2 represents the source of power for the motor. A control panel 3 is necessary for the protection, starting and reversal of the armature of the motor. The motor has a shunt field 4 which is connected to a source of power 5 which is normally the same source as 2. Field rheostats and various field control units which are normally required are represented at 6. A small drive motor which may be in the order of 1 H.P. for a motor generator set is represented at 7. Motor 7 may be driven by either A.C. or D.C., in which latter case it may or may not be driven from the same source of power as represented by 2 and 5. The armature of a low voltage D.C. generator is indicated at 8. In the case shown, the armature 8 must carry all of the current in the main field of the large motor under discussion, shunt field 4, and therefore must have a commutator adequate for this purpose. The field for the generator is represented at 9, which field would be of such strength that under full load conditions sufficient field magnetic flux will be induced to generate sufficient voltage in armature 8 so as to increase the current in armature 8 and shunt field 4 by approximately 10%. The results of the inter-actions and operation of the diagram as indicated above are such that as the load on the armature 1 of the shunt motor is increased, its field strength is also increased by an amount greater than the armature reaction and the motor will decrease in speed and will thus have the stabilized operation as designed.

It is, of course, obvious that the current in the field 9 is entirely too great to use on the field poles of the small generator. Consequently, a shunt would be used in the position as indicated by 10 and a very small field current would be used in field 9.

Figure 2:
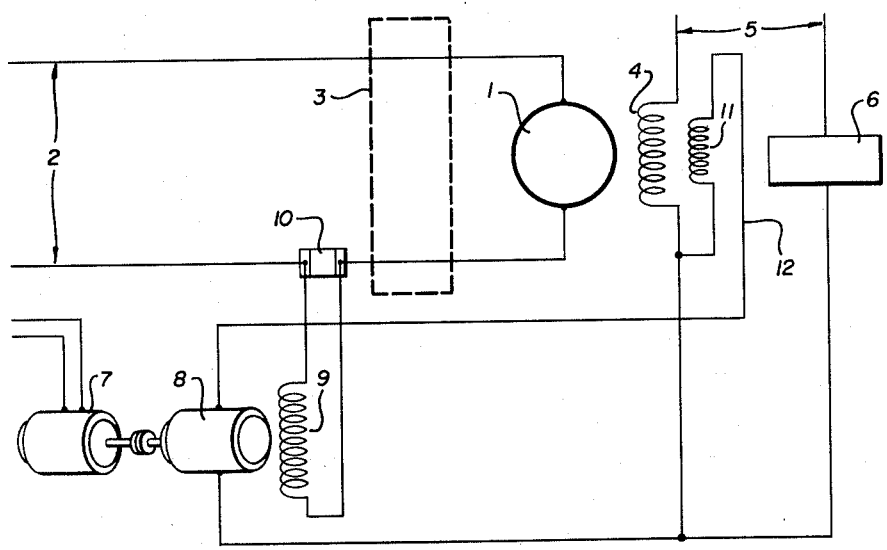

FIGURE 2 represents a modification of FIGURE 1. An auxiliary shunt field 11 is added to the motor, and this field will be of such size that when full load current is applied to the motor, field 11 will add approximately 10% to the magnetic flux of field 4. This field though relatively small will not reduce the cost of the main motor. It has, in addition, the disadvantage that it will require an extra field wire 12. The advantage of this system as compared with FIGURE 1 is the smaller currents in the armature 8 and the smaller size of the motor generator set.

FIGURE 3 also represents a modification of FIGURE 1. In this case the direct current as generated by armature 8 flows through the shunt field 4 in parallel with the current received from source 5. An auxiliary shunt field such as shown by field 11 in FIGURE 2 is not necessary in this case, although the extra wire 12 is still required. However, a permanently fixed resistor 13 must be inserted in the main field circuit. If resistor 13 is not used, the generation of power by armature 8 would not change the field strength in 4, but would only decrease the field current as furnished by source 5. A bias field 14 which has been added to the generator receives its energy from a D.C. source which may be separate or may be the same source as source 2 and/or source 5. For no current in armature 1 or field 9, the voltage generated by armature 8 should be adjusted to approximately balance the voltage across field 4 and thus no current would be delivered by generator 8. The two fields 9 and 14 are additive in effect and as the field in 9 increases, the voltage in 8 increases and causes current to flow from 8. The field strength in 4 thus increases and the required result is obtained.

FIGURE 4 represents a further modification of FIGURE 1. In this case the voltage and current generated in 8 is across resistor 13. The extra wire 12 is not required. The bias field 14 is wound differentially with respect to 9. The field of 14 is adjusted such that under no load conditions in armature 1 the voltage generated by 8 is greater than the voltage across resistor 13 when normal current is flowing in field 4. The field 14, field 9 and resistor 13 shall be proportioned to meet the following conditions:

(a) For no current in 1 and 9 the current in 4 shall be normal.

(b) For full load current in 1 and 9 the current in 4 shall be approximately 110% of normal.

(c) For 200% current in 1 and 9 the current in 4 shall be approximately 120% of normal.

Figure 5:
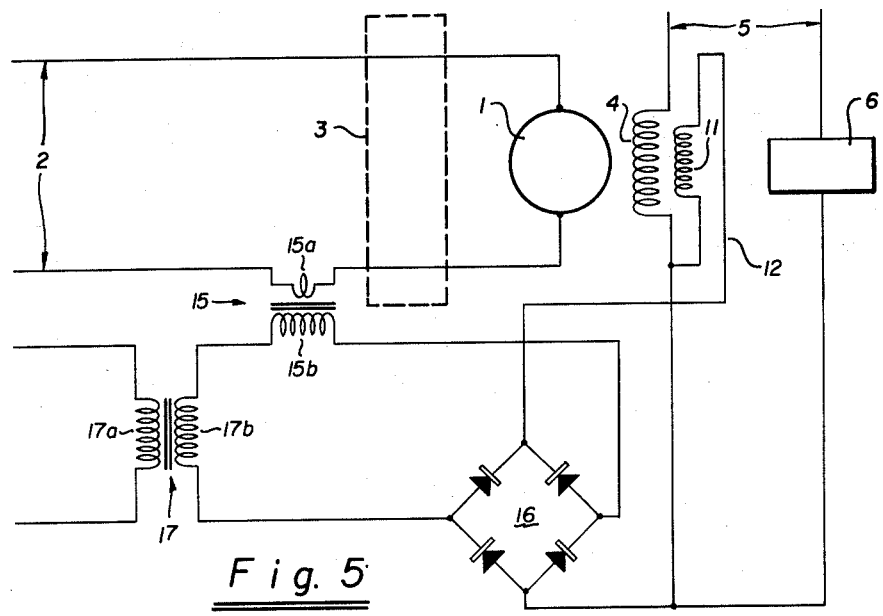
FIGURE 5 is a diagrammatic sketch showing an embodiment of the invention which is similar to FIGURE 1 except that a transductor is used instead of a motor generator.

FIGURE 5 is a more radical modification of FIGURE 1. In place of using a small motor generator set, a transductor 15 is used. Like FIGURE 2, a shunt field 11 is on the motor and a single wire 12 runs to this motor. A rectifier assembly comprised of at least one rectifier, such as rectifier 16 shown in the figure, is used in conjunction with the transductor 15 as shown, and power is received from the isolating transformer 17. Transformer 17 performs two functions in that it furnishes the proper voltage to the transductor system and also furnishes an isolating means from the main A.C. system which may be very desirable. A single turn for the transductor coil 15a may be used, or a shunt such as shunt 10 in FIGURES 1 to 4 may be used. 15b represents a secondary coil around the transductor and, depending upon the current in 15a, permits the A.C. current generated in 17b to pass through the circuit in proportion to the current at armature 1. This current is rectified in 16 and thus furnishes the D.C. power required by field 11. At zero current in armature 1 there is no current in field 11 and at full load current in armature 1 the current at 11 is such that it adds approximately 10% additional to the magnetic flux of field 4.

Figure 6:
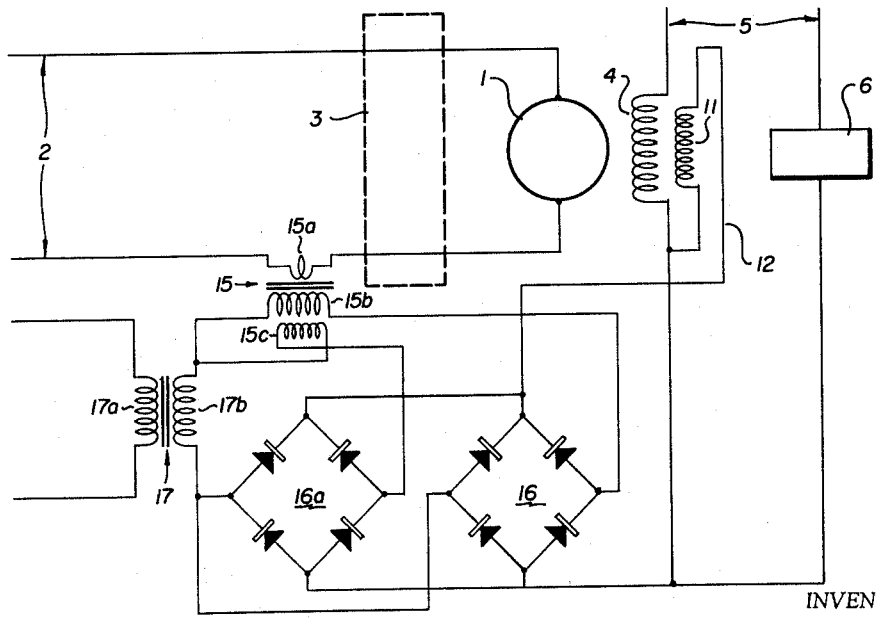
FIGURES 6, 7 and 8 are diagrammatic sketches showing modifications of FIGURE 4.

FIGURE 6 is similar to FIGURE 5 except that a rectifier assembly, comprised of two sets of rectifiers, 16 and 16a, is shown as this creates a smoother wave form for field 11. Coil 15c is added to the transductor as a part of the additional rectifier. This dual rectifier arrangement, although not shown on the subsequent figures, may be used wherever a rectifier is shown.

Figure 7:
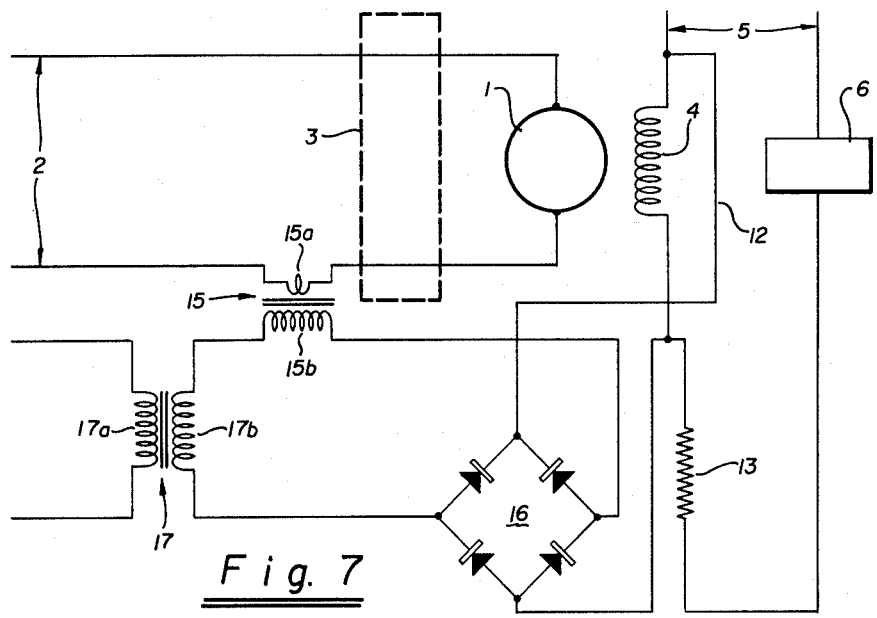

FIGURE 7 is a modification of FIGURE 5 and is similar to the embodiment shown in FIGURE 3 except that a rectifier instead of the small motor generator set is used. An extra shunt field is is not required for the main motor, although the extra field wire 12 is required. The resistor 13 is also required.

Figure 8:
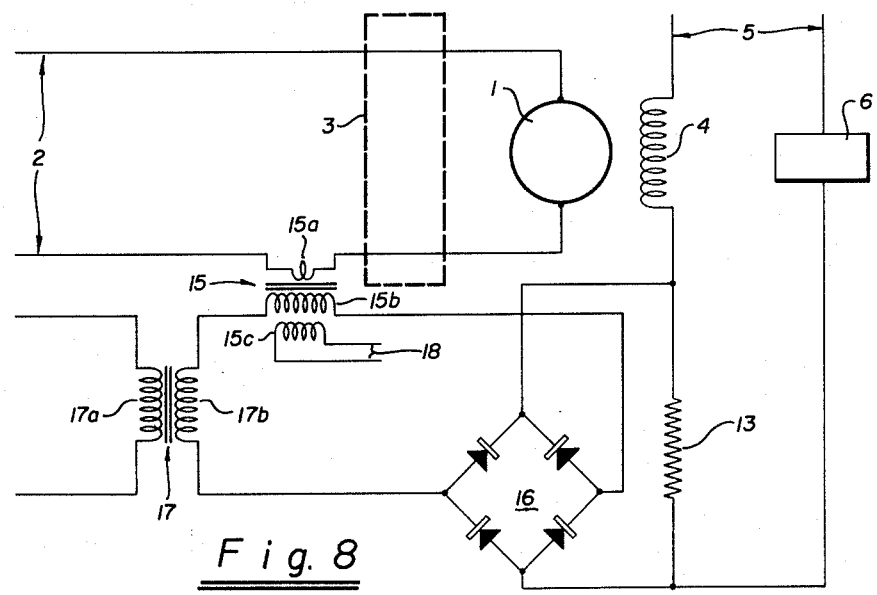

FIGURE 8 is a further modification of FIGURE 5 and is similar to the embodiment shown in FIGURE 4 except for the use of a rectifier. The bias field 15c which receives D.C. power from a source 18 shall be so adjusted as to meet the same conditions as the embodiment shown in FIGURE 4.

A specific illustration is the use of a mill type motor driving the reversing table adjacent to a mill. The power supply for this motor may be either from a constant potential source or a variable potential source, dependent upon the speed matching requirements of the mill. The panel controlling the motor may be located in either the main motor room or in a control house. From this panel the present method is to run four circuit lines to the motor—two for the armature and two for the series field, and using a 100 H.P. motor which would be a mill type motor on AISE Frame No. 614. There would be used three 250,000 cm. cables in each circuit line plus two #8 wires for the existing shunt field plus two #8 wires for a shunt brake, if such brake is required, plus any additional #8 wire as may be required for limit switches and interlocking purposes.

With the use of the instant invention, as proposed above, two of the main circuit lines or a total of six 250,000 cm. cables would be replaced by either none, one or two #8 wires depending upon which of the disclosed embodiments were used. In addition to the saving of the cable—which costs approximately 65 cents per foot, or for six cables a total of substantially $4.00 per foot and which, when installed in conduit, would cost in excess of $10.00 per foot—there is also the very great advantage of saving of space. The problems of finding room for all of the conduit required adjacent to this switchboard are very complicated. Furthermore, in addition to the above, there is a saving in electric energy represented by the I²R loss of the two extra circuit lines that are presently in use.

It will be apparent from the above description that by practice of the instant invention direct current shunt motors can be operated in a manner to eliminate the unstable characteristic, thereby permitting a shunt motor capable of reversal to be used in various applications, e.g., rolling mill installations, with a realization of a savings in wiring costs and also a substantial savings in energy because of fewer wires required.

The foregoing description sets forth advantageous embodiments of the invention. It will be understood, however, that modifications can be made therein without departing from the spirit and scope of the invention as defined in the appended claim.

I claim:

In combination with a direct current shunt mill motor, a system comprising a transductor, an auxiliary shunt field on said shunt motor, a transformer, and a rectifier assembly comprised of at least one rectifier, the primary coil of said transductor being electrically connected in series to the armature of said shunt motor and the secondary coil of said transductor being electrically connected to the secondary winding of said transformer, and secondary winding of said transformer also being electrically connected to said rectifier assembly, means electrically connecting said auxiliary shunt field of said shunt motor to said rectifier assembly and in turn to said transformer, whereby said transformer supplies current to the auxiliary shunt field of said shunt motor through the secondary winding of the transductor and the rectifier assembly thereby increasing the magnetic flux of the shunt field of said shunt motor upon increase of current in said armature of said shunt motor.

References Cited in the file of this patent

UNITED STATES PATENTS 1,764,365   Stoltz _____ June 17, 1930